United States Patent [19]

Riordan

[11] Patent Number: 4,507,545
[45] Date of Patent: Mar. 26, 1985

[54] SOLDERING IRON WITH SOLDER DISPENSING DEVICE

[76] Inventor: James F. Riordan, 1859 Andrews Ave., San Jose, Calif. 95124

[21] Appl. No.: 328,830

[22] Filed: Dec. 7, 1981

[51] Int. Cl.³ .............................. B23K 3/06; H05B 1/00
[52] U.S. Cl. .................................... 219/230; 228/52; 226/128
[58] Field of Search ........................... 228/51, 52, 53; 219/230; 226/127, 128; 222/146

[56] References Cited

U.S. PATENT DOCUMENTS

| | | | |
|---|---|---|---|
| 1,925,656 | 9/1933 | Duitz | 228/53 |
| 2,014,728 | 12/1935 | Forney | 219/230 |
| 2,058,634 | 10/1936 | Rusk | 226/128 |
| 2,280,879 | 4/1942 | Anderson | 228/53 |
| 2,444,267 | 6/1948 | Pereira | 228/53 |
| 3,211,355 | 10/1965 | Zoltai | 228/52 |
| 3,232,509 | 2/1966 | Newton | 226/127 |
| 3,252,645 | 5/1966 | Zoltai | 228/52 |
| 3,521,804 | 7/1970 | Jacobs | 228/51 |

FOREIGN PATENT DOCUMENTS

| | | | |
|---|---|---|---|
| 125091 | 12/1900 | Fed. Rep. of Germany | 228/53 |
| 3007313 | 3/1982 | Fed. Rep. of Germany | 228/51 |
| 116609 | 6/1946 | Sweden | 228/53 |
| 463141 | 3/1937 | United Kingdom | 228/53 |

Primary Examiner—C. L. Albritton
Assistant Examiner—Teresa J. Walberg
Attorney, Agent, or Firm—Townsend and Townsend

[57] ABSTRACT

A device for feeding solder wire from a spool to the heated tip of a pencil-type solder iron. The device includes a rigid support strip secured by a pair of spaced bands to the front and rear ends of the elongated handle of the soldering iron. The strip extends longitudinally of the handle and is at one side of the handle. A guide provided with a wire-receiving passage therethrough is carried by the support strip. The guide includes a flexible tube which extends forwardly from the front end of the handle. The forward end of the tube is open and is located near the tip of the soldering iron. A spool of solder wire is rotatably mounted on the support strip near the rear end thereof. A first wheel is adjustably mounted on the support strip forwardly of the spool for fictionally engaging the solder wire extending through the guide to advance the solder wire forwardly through the guide when the first wheel is rotated in one direction relative to the support. A second wheel larger in diameter then the first wheel is secured to one side of the first wheel and is coaxial therewith. The second wheel is adapted to be engaged by the index finger of the hand when the handle of the soldering iron is supported between the index finger and the thumb of the hand. The wheels are adjustably mounted as a unit on the support so that the amount of frictional force exerted by the first wheel on the solder wire can be adjusted.

7 Claims, 2 Drawing Figures

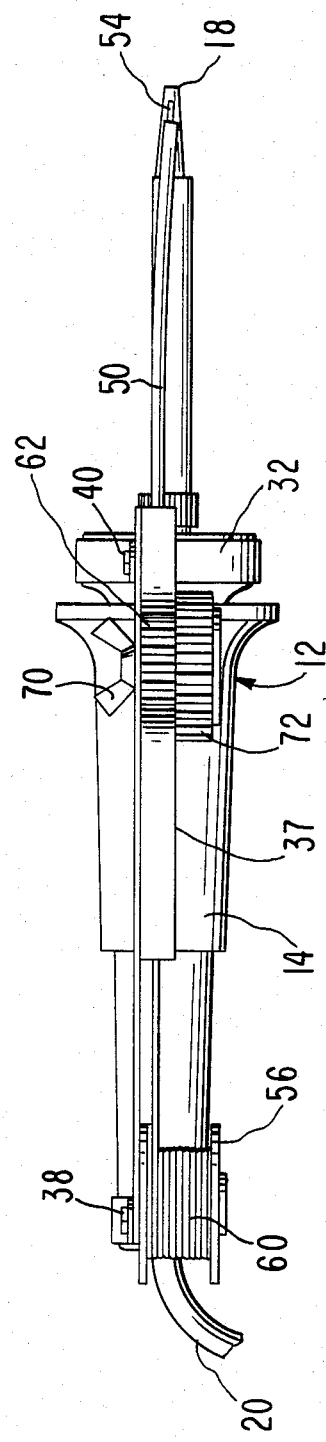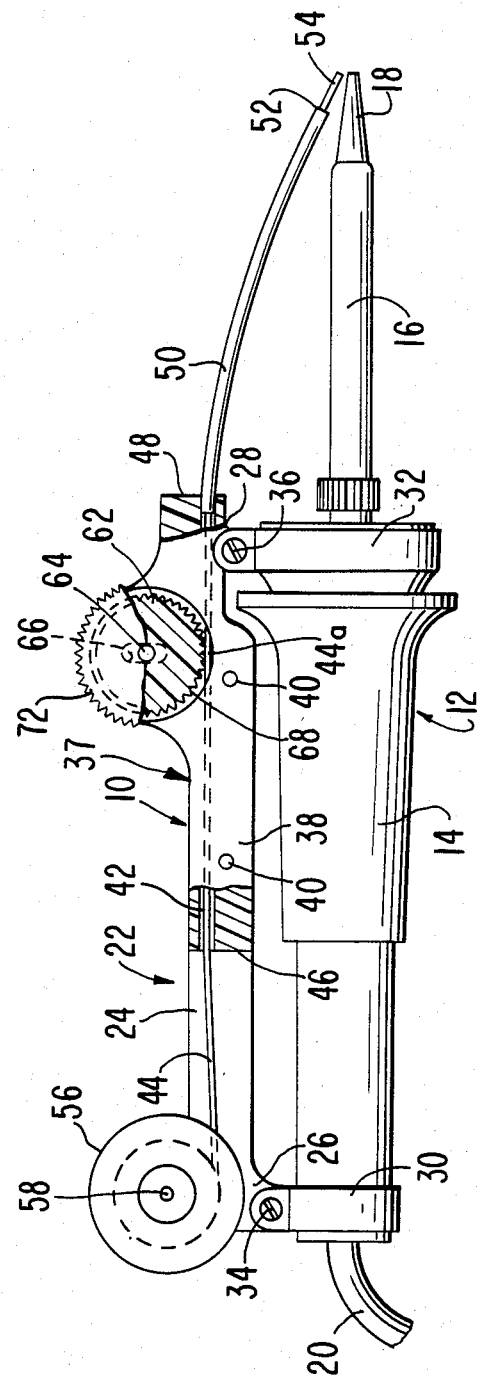

4,507,545

SOLDERING IRON WITH SOLDER DISPENSING DEVICE

This invention relates to improvements in the dispensing of solder to pencil-type soldering irons and, more particularly, to an improved solder dispenser or a soldering iron of this type.

BACKGROUND OF THE INVENTION

Dispensers for feeding solder to the tips of soldering irons have been known and used in the past. Solder dispensers for pencil-type soldering irons are disclosed in U.S. Pat. Nos. 3,211,355, 3,252,645 and 3,531,038. The first two of these patents disclose the use of a pivotally mounted solder dispenser which is cumbersome to use and awkward to position to properly feed wire solder to the tip of a pencil-type soldering iron. Moreover, the solder supply for each of the solder dispensing devices of the first two patents is remote from the device itself, requiring one hand to feed solder to the device while holding the soldering iron in the other hand during a soldering operation. In the third patent mentioned above, the solder dispenser is complicated in construction and difficult to manipulate and control. It also suffers from the fact that the solder supply is remote from the dispenser itself.

Solder dispensers have also been provided for other types of soldering irons, such as soldering guns. Disclosures in this category include U.S. Pat. Nos. 2,432,428, 2,797,293, 3,097,286, 3,707,258 and 4,247,137. A solder dispenser for a very early type soldering iron is disclosed in U.S. Pat. No. 1,083,363. In the latter patent, the soldering dispenser is pivotally mounted on the soldering iron and is made so that the feeding of solder to the heated tip of the soldering iron is awkward and difficult to control.

Because of the above-described drawbacks of solder dispensers which have previously been known and used, a need has arisen for improvements in such dispensers, especially solder dispensers for pencil-type soldering irons which conventionally permit one hand soldering operations.

SUMMARY OF THE INVENTION

The present invention is directed to an improved solder dispensing device for a pencil-type soldering iron wherein the device is adapted to be secured to and extend along one side of the handle of such a soldering iron and to be operated by the index finger of the hand as the handle of the soldering iron is held in the hand between the index finger and the thumb. The device includes a support in the form of a rigid strip having a pair of bands for securing the strip to the front and rear ends of the handle of the soldering iron. A wire guide is secured to the strip and has a wire-receiving passage therethrough for receiving a solder wire from a spool of solder rotatably mounted on the rear end of the strip. The guide includes a flexible tube extending forwardly from the strip. The front end of the tube is open and located near the heated tip of the soldering iron. The tube is flexible so that the front end thereof can be adjusted in position with reference to the heated tip.

Means for feeding the wire through and out of the guide includes a first wheel which is adjustably mounted on the strip and frictionally engages the solder wire intermediate the ends of the guide. The guide has a recess which exposes a segment of the wire and rotatably receives the first wheel. A second wheel is secured at one side of the first wheel and is co-axial therewith, the second wheel being larger in diameter than the first wheel and adpted to be engaged by the index finger of the hand when the handle of the soldering iron is carried between the index finger and the thumb of the hand. The second wheel allows for advancing of a relatively long length of the solder wire through and out of the guide for a relatively small angular rotation of the first wheel, thereby providing maximum control of the solder wire with one-finger manipulation of the wheels. Since the strip is rigid to the handle of the soldering iron, the strip need not be pivoted toward the handle as in the prior art references to cause feeding of the solder wire to heated tip.

The flexible tube forming part of the guide permits placement of the forward end of the solder wire close to or spaced away from the heated tip of the soldering iron. This feature permits the user to adjust the solder wire at the most desirable angle for controlled delivery of molten solder to the heated tip. The solder dispensing device can be converted easily to left hand operation or to right hand operation, depending upon the user's preference. This is achieved by attaching the guide to one side or to the other side of the strip. Also, the solder supply spool can be snapped on and off the strip to permit rapid replacement of the spool when its solder supply is depleted.

The mounting of the device on the handle of the pencil type soldering iron provides interference-free operation of the device since only a single finger of one hand the operator is required to advance the wire through the device and to feed the wire to the heated tip of the soldering iron as the handle of the soldering iron is held in the same hand. The volume of wire delivered by the device is totally controlled from the smallest length to the longest length. The frictional contact between the advancing wheel and the solder wire is adjustably set only once and maintained at all times. The wheel remains in frictional engagement with the wire and does not float away from it as occurs when using solder dispensing devices of several of the prior references mentioned above.

The primary object of the present invention is, therefore, to provide an improved solder dispensing device for a pencil-type solder wherein the feeding of solder wire to the tip of a soldering iron can be controlled with one finger of the hand yet the solder can be easily and quickly advanced without straining the hand or finger yet the device is simple and rugged in construction and can be inexpensive to produce.

Another object of this invention is to provide a soldering dispensing device of the type described wherein the device has a spool for holding a supply of wire solder and the spool is quickly snapped on and taken off the device so that the device is self-contained and one spool whose solder has been used up can be quickly replaced with another spool holding a fresh supply of solder.

Other objects of this invention will become apparent as the specification progresses, reference being had to the accompanying drawings for an illustration of this invention.

IN THE DRAWING

FIG. 1 is a top plan view of a conventional pencil-type soldering iron having the improved solder dispensing device of the present invention mounted thereon; and FIG. 2 is a side elevation view, partly broken away and in section, of the soldering iron and the solder dispensing device therein.

The solder dispensing device of the present invention is broadly denoted by the numeral 10 is adapted to be used with a conventional pencil-type soldering iron 12 of the type having a handle 14 and a soldering iron element 16 secured to and projecting forwardly from the front end of handle 14. Handle 14 can be of any cross-section, but typically, it is circular in cross-section. Also, handle 14 is generally of a non-conductive, insulating material, such as plastic or wood. Soldering iron element 16 is metallic and has a circular cross-section. Element 16 is provided with a tip 18 which reaches a temperature above the melting temperature of solder. A typical soldering iron of this type is one identified as a Weller TC 201 soldering iron. The soldering iron element 16 is coupled by way of an electrical wire 20 to a source of electrical power, such as 110 volts AC. The soldering iron is used in a conventional manner as is well known.

Device 10 includes a support 22 which is secured to handle 14 and extends longitudinally along and is spaced from the handle. In paractice, support 22 is at the top of the handle with reference to the way in which the handle is held in one hand between the index finger and the thumb.

Support 22 includes a rigid strip 24, typically of aluminum, plastic or the like, the strip having a pair of ears 26 and 28 at respective ends thereof as shown in FIG. 2. Ends 26 and 28 are adapted to be secured to bands 30 and 32, respectively, which are wrapped about respective ends of handle 14 and are secured to the ears by screws 34 and 36 having nuts 38 and 40 (FIG. 1) threaded on the ends thereof. In this way, strip 24 is rigidly secured to handle 14 and is spaced laterally therefrom in the manner shown in FIG. 2. Normally, the support strip 24 substantially overlies a major portion of the handle in the manner shown in FIG. 1 when the soldering iron 12 is held in the hand during a soldering operation.

A guide 37 is carried by strip 24 to direct a movable solder wire in a forward direction toward heated tip 18. Guide 37 includes a first guide member 38 removably secured by screws 40 to one side of support 24. Member 38 can be of any suitable material. Typically, it is formed of Delrin, nylon or the like. Member 38 has a wire-receiving passage 42 therethrough for receiving a solder wire 44 from a spool 56. Passage 42 extends from one end 46 of member 38 to the opposite end 48 thereof. At end 48, a second member or tube 50 is press-fitted into passage 42 and extends outwardly and forwardly therefrom. Tube 50 generally is of a relatively rigid material capable of being flexed and has a forward end 52 near tip 18 of soldering iron element 16 as shown in FIGS. 1 and 2. Solder wire 44 can be moved through passage 42 and through tube 50 so that the forward end 54 of the solder wire emerges from front end 52 of tube 50 and is adjacent to tip 18 so that the heat energy from tip 18 can melt the solder from front end 54 of solder wire 44 for soldering purposes. Since tube 50 can be flexed while being relatively rigid, the location of end 54 relative to heated tip 18 can be adjusted so as be relatively close to or relatively far from the tip, depending upon the amount of solder to be provided to the tip 18.

Spool 56 is removably and rotatably mounted on strip 24 so as to be quickly and easily placed on and taken off the strip. The spool can be snapped on a shaft 58 carried by strip 24 and the solder wire can be in the form of a coil 60 on the spool as shown in FIG. 1.

Means for feeding solder wire 44 forwardly from spool 56 through passage 42 and tube 50 includes a first wheel 62 rotatably mounted on a shaft 64 carried by strip 24. Shaft 64 extends through a vertical slot 66 in strip 24 so that the height of the shaft and thereby first wheel 62 relative to passge 42 can be adjusted to cause first wheel 62 to be in frictional engagement with an exposed portion 44a of the solder wire in the manner shown in FIG. 2. Portion 44a is exposed to wheel 62 by virtue of a recess 68 formed in member 38 sufficiently deep so that passage 42 is opened at the bottom of recess 68 to expose wire portion 44a. A wing nut 70 is threadably mounted on the opposite end of shaft 64 so that the shaft can be releasably secured to strip 24 while first wheel 62 is rotatable on the shaft.

A second wheel 72 larger in diameter than wheel 62 is secured to one side of first wheel 62 and is coaxial with the first wheel. The purpose of the second wheel 72 is to provide a means to rotate first wheel 62 by one finger as soldering iron 10 is held in the hand between the index finger and the thumb. The wheel second 72 is turned typically by the index finger of the hand. Since second wheel 72 has a greater diameter than wheel 62, a greater amount of control of the solder wire movement can be achieved than if wheel 62 were manipulated by the finger.

In use, solder dispensing device 10 is mounted by bands 30 and 32 or any other suitable structure on handle 14 of soldering iron 12 in the manner shown in FIGS. 1 and 2. Then, spool 56 is put in place with solder wire 44 extending forwardly from the spool. The solder wire is fed through passage 44, through recess 68, back into passage 42 and then through tube 50. The front end 54 of wire 44 then projects out of the tube 50. The solder wire 44 is forced through passage 42 and tube 50 while first wheel 62 is essentially out of its operative position in frictional engagement with the solder wire. This is possible by rotating wing nut 70 so that it allows shaft 64 to rise in slot 66. When solder wire 44 is in passage 42 and tube 50, wheel 62 is forced downwardly into engagement with wire portion 44a and wing nut 70 is tightened so that rotation of wheel 62 by rotating wheel 72 with one finger in a couterclockwise sense (viewing FIG. 2) will advance solder wire 44 forwardly through and out of tube 50.

Soldering iron 12 is then energized and tip 18 is caused to heat the junction between two members to be soldered together. During this time, solder wire 44 can be advanced incrementally through tube 50 by manipulation of wheel 72 by the index finger of the hand. A relatively small rotation of wheel 72 causes a relatively long length of wire 44 to be advanced forwardly. After the soldering operation or operations have been completed, the soldering iron is de-energized and put away until ready for use again.

Since member 38 as shown in FIG. 1 is on the right side of strip 24 with reference to looking in a forward direction along the soldering iron, wheel 72 is in a position to be engaged by the index finger of the right hand as the soldering iron is held in the right hand. For left-handed users of soldering iron 12, the position of member 38 can be reversed so that member 38 will be on the left hand side of strip 24. In such a case, wheel 72 will be in a position to be engaged by the index finger of the left hand as the soldering iron is held in the left hand with the handle between the thumb and index finger of the left hand. This feature can be realized because member 38 is removably held by screws 40 to strip 24.

What is claimed is:

1. A solder dispensing device for a soldering iron having a handle and a soldering tip comprising: an elongated support; means coupled with the support at a pair of spaced locations thereon for rigidly mounting the support on the handle of the soldering iron with the support extending longitudinally of and adjacent to the handle; a spool of solder wire mounted on the support near one end thereof for rotation with respect thereto, the support having a passage therethrough extending between the ends thereof for receiving the solder wire from the spool and directing the solder wire along a predetermined path to a location near the tip of the soldering iron when the support is on the handle of the soldering iron, said passage having an opening intermediate its ends to expose a segment of the solder wire extending through the passage; and wheel means adjustably mounted in a fixed position on the support between said locations for normally drivingly engaging said solder wire segment and for advancing the solder wire along said path.

2. A device as set forth in claim 1, wherein said support includes a guide and a tube extending forwardly from the guide, said tube having an open end near the tip of the solder iron when the support is on the handle of the soldering iron.

3. A device as set forth in claim 2, wherein the tube is relatively rigid and can be flexed.

4. A device as set forth in claim 1, wherein the wheel means include a first wheel frictionally engagable with the solder wire intermediate the ends of the path as the wire extends along said path, the first wheel having a shaft provided with means for adjustably mounting the shaft in a fixed position on the support.

5. A device as set forth in claim 4, wherein the support has a slot, the shaft being adjustably received in the slot, and means coupled with the shaft for releasably securing same in a any one of a number of fixed positions in the slot.

6. A device as set forth in claim 4, wherein is included a second wheel rigidly attached to the first wheel at one side thereof, the second wheel having a diameter greater than the first wheel and being co-axial therewith.

7. A device as set forth in claim 1, wherein said support has a pair of sides and includes a guide, the guide being releasably secured to one side of the support, the guide being capable of being mounted to the opposite side of the support, whereby the dispensing means can be engaged by the finger of either hand.

* * * * *